(12) United States Patent
Ding et al.

(10) Patent No.: US 12,221,117 B2
(45) Date of Patent: Feb. 11, 2025

(54) VEHICLE CONTROL

(71) Applicant: BEIJING SANKUAI ONLINE TECHNOLOGY CO., LTD, Beijing (CN)

(72) Inventors: Shuguang Ding, Beijing (CN); Xiaoyang Guo, Beijing (CN); Dongchun Ren, Beijing (CN); Sheng Fu, Beijing (CN); Deheng Qian, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 383 days.

(21) Appl. No.: 17/677,671

(22) Filed: Feb. 22, 2022

(65) Prior Publication Data

US 2022/0176977 A1  Jun. 9, 2022

Related U.S. Application Data

(63) Continuation-in-part of application No. PCT/CN2020/121620, filed on Oct. 16, 2020.

(30) Foreign Application Priority Data

Nov. 27, 2019  (CN) .......................... 201911185658.3

(51) Int. Cl.
*B60W 50/00* (2006.01)
*G06N 7/01* (2023.01)

(52) U.S. Cl.
CPC .... *B60W 50/0097* (2013.01); *B60W 50/0098* (2013.01); *G06N 7/01* (2023.01);
(Continued)

(58) Field of Classification Search
CPC ......... B60W 50/0097; B60W 50/0098; B60W 2050/0005; B60W 2050/0028;
(Continued)

(56) References Cited

U.S. PATENT DOCUMENTS

| 2019/0049968 A1* | 2/2019 | Dean ....................... G06T 7/292 |
| 2019/0114798 A1* | 4/2019 | Afrouzi .................... G06T 7/30 |
| 2019/0299999 A1 | 10/2019 | Liu et al. |

FOREIGN PATENT DOCUMENTS

| CN | 102717797 A | 10/2012 |
| CN | 103381826 A | 11/2013 |

(Continued)

OTHER PUBLICATIONS

Extended European Search Report Communication Pursuant to Rule 62 EPC, dated May 23, 20222 in Patent Application No. EP 20893631.0, which is a foreign counterpart application to which this application claims priority.

(Continued)

*Primary Examiner* — Jess Whittington
*Assistant Examiner* — Brian E Yang
(74) *Attorney, Agent, or Firm* — Kolitch Romano Dascenzo Gates LLC (57) ABSTRACT

Vehicle control is provided, including: obtaining vehicle information of a target vehicle and environmental information of a reference environment in which the target vehicle is located; obtaining a target matrix based on the vehicle information and the environmental information; splitting the target matrix to obtain a plurality of sub-matrices; and obtaining target driving control information of the target vehicle based on matrix elements in the sub-matrices and driving control information of a surrounding vehicle of the target vehicle.

18 Claims, 3 Drawing Sheets

(52) U.S. Cl.
CPC ............... *B60W 2050/0005* (2013.01); *B60W 2050/0028* (2013.01)

(58) Field of Classification Search
CPC ....... B60W 60/0011; B60W 60/00272; B60W 60/00276; B60W 50/00; G06N 7/01; G05D 1/0088
See application file for complete search history.

(56) References Cited

FOREIGN PATENT DOCUMENTS

| | | |
|---|---|---|
| CN | 104850916 A | 8/2015 |
| CN | 108009524 A | 5/2018 |
| CN | 108725452 A | 11/2018 |
| CN | 109572550 A | 4/2019 |
| CN | 109727490 A | 5/2019 |
| CN | 110077416 A | 8/2019 |
| CN | 110386145 A | 10/2019 |
| CN | 110497906 A | 11/2019 |
| CN | 110920631 A | 3/2020 |
| EP | 2615598 A1 | 7/2013 |

OTHER PUBLICATIONS

Schuster, Michael et al.; "Tracking of Vehicles on Nearside Lanes Using Multiple Radar Sensors", 2014 International Radar Conference, IEEE, pp. 1-6; Oct. 13, 2014.
Communication pursuant to Article 94(3) EPC of European application No. 20893631.0 issued on Jun. 7, 2022.
International Search Report of the International Searching Authority for State Intellectual Property Office of the People's Republic of China in PCT application No. PCT/CN2020/121620 issued on Jan. 25, 2021, which is an international application corresponding to this U.S. application.
The State Intellectual Property Office of People's Republic of China, First Office Action in Patent Application No. CN201911185658.3 issued on Sep. 28, 2020, which is a foreign counterpart application corresponding to this U.S. Patent Application, to which this application claims priority.
Notification to Grant Patent Right for Invention of Chinese Application No. 201911185658.3 issued on Jan. 13, 2021.

* cited by examiner

VEHICLE CONTROL

This application is a continuation-in-part application of international application No. PCT/CN2020/121620, filed on Oct. 16, 2020 and entitled "VEHICLE CONTROL", which claims priority to Chinese Patent Application No. 201911185658.3, filed on Nov. 27, 2019 and entitled "METHOD AND APPARATUS FOR CONTROLLING VEHICLE, ELECTRONIC DEVICE, AND READABLE-STORAGE MEDIUM". Both applications are herein incorporated by reference in their entireties.

TECHNICAL FIELD

The present disclosure relates to the field of artificial intelligence (AI) technologies, and in particular, to vehicle control.

BACKGROUND

With the development of AI technologies, more and more AI technologies are applied to people's life, and a vehicle control technology is one of them. In a traffic scene, the vehicle control technology is used for driving a vehicle.

SUMMARY

An embodiment of the present disclosure provides vehicle control. The technical solutions are as follows.

According to an aspect, a method for controlling a vehicle is provided, including:
  obtaining vehicle information of a target vehicle and environmental information of a reference environment in which the target vehicle is located;
  obtaining a target matrix based on the vehicle information and the environmental information, where an element in the target matrix is a probability value that the target vehicle transfers to a next state after performing an action in a current state;
  splitting the target matrix to obtain a plurality of sub-matrices; and
  obtaining target driving control information of the target vehicle based on matrix elements in the sub-matrices and driving control information of a surrounding vehicle of the target vehicle, where the target driving control information is used for controlling the target vehicle.

According to an aspect, an apparatus for controlling a vehicle is provided, including: a processor and a memory, the memory storing at least one instruction, the at least one instruction being loaded and executed by the processor to implement the method for controlling the vehicle, the method including:
  obtaining vehicle information of a target vehicle and environmental information of a reference environment in which the target vehicle is located;
  obtaining a target matrix based on the vehicle information and the environmental information, where an element in the target matrix is a probability value that the target vehicle transfers to a next state after performing an action in a current state;
  splitting the target matrix to obtain a plurality of sub-matrices; and
  obtaining target driving control information of the target vehicle based on matrix elements in the sub-matrices and driving control information of a surrounding vehicle of the target vehicle, where the target driving control information is used for controlling the target vehicle.

According to another aspect, a non-transitory computer-readable storage medium is provided, storing at least one instruction, the instruction being loaded and executed by a processor to implement the method for controlling the vehicle, the method including:
  obtaining vehicle information of a target vehicle and environmental information of a reference environment in which the target vehicle is located;
  obtaining a target matrix based on the vehicle information and the environmental information, where an element in the target matrix is a probability value that the target vehicle transfers to a next state after performing an action in a current state;
  splitting the target matrix to obtain a plurality of sub-matrices; and
  obtaining target driving control information of the target vehicle based on matrix elements in the sub-matrices and driving control information of a surrounding vehicle of the target vehicle, where the target driving control information is used for controlling the target vehicle.

BRIEF DESCRIPTION OF THE DRAWINGS

To describe the technical solutions in the embodiments of the present disclosure more clearly, the accompanying drawings required for describing the embodiments are briefly described hereinafter. Apparently, the accompanying drawings in the following descriptions show merely some embodiments of the present disclosure, and a person of ordinary skill in the art may obtain other accompanying drawings according to these accompanying drawings without creative efforts.

DETAILED DESCRIPTION

To make objectives, technical solutions, and advantages of the embodiments of the present disclosure clearer, the following further describes in detail implementations of the present disclosure with reference to the accompanying drawings.

In a traffic scene, how to control a vehicle is a key to ensuring driving safety. The related art provides a method for controlling a vehicle, including: obtaining a matrix corresponding to a controlled vehicle, where elements in the matrix are respectively used for indicating probabilities that the controlled vehicle transfers from a current state to a next state, and a number of dimensions of the matrix is equal to a number of states that the controlled vehicle may be in, determining values of the elements in the matrix subsequently, and obtaining a policy based on the determined values of the elements, to control the controlled vehicle according to the policy.

However, in a complex traffic scene, the number of states that the controlled vehicle may be in is relatively large, and the number of dimensions of the matrix is also relatively large, resulting in a relatively large calculation amount required for determining the values of the elements in the matrix and high calculation complexity, which affects efficiency of controlling the vehicle.

Figure 1:
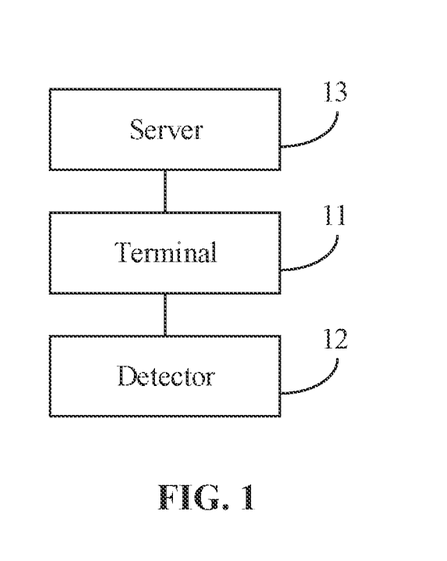
FIG. 1 is a schematic diagram of an implementation environment according to an embodiment of the present disclosure.

This embodiment of the present disclosure provides a method for controlling a vehicle. The method may be applied to the implementation environment shown in FIG. 1. In FIG. 1, at least one terminal 11, a detector 12, and a server 13 are included. The terminal 11 is communicatively connected to the detector 12, and the terminal 11 is also communicatively connected to the server 13.

The terminal 11 obtains vehicle information of a target vehicle detected by the detector 12 and environmental information of a reference environment in which the target vehicle is located. In some implementations, after obtaining the vehicle information of the target vehicle detected by the detector 12 and the environmental information of the reference environment in which the target vehicle is located, the terminal 11 executes a calculation process locally. The terminal 11 obtains target driving control information of the target vehicle through the calculation process, and controls the target vehicle according to the target driving control information, to implement the method for controlling the vehicle in this embodiment of the present disclosure. In some other implementations, after obtaining the vehicle information of the target vehicle detected by the detector 12 and the environmental information of the reference environment in which the target vehicle is located, the terminal 11 sends the vehicle information of the target vehicle and the environmental information of the reference environment in which the target vehicle is located to the server 13, and the server 13 executes the calculation process. After obtaining the target driving control information of the target vehicle through the calculation process, the server 13 returns the target driving control information to the terminal 11, and the terminal 11 can control the target vehicle according to the received target driving control information, to implement the method for controlling the vehicle in this embodiment of the present disclosure.

Exemplarily, the terminal 11 is a terminal configured to control an autonomous vehicle to complete an automatic driving process. The automatic driving process is also referred to as unmanned driving process. For example, the terminal 11 includes, but is not limited to, an intelligent vehicle machine installed on an autonomous vehicle. Exemplarily, the server 13 is a server, or a server cluster that includes a plurality of servers, or a cloud computing service center.

A person skilled in the art can understand that the terminal 11 and the server 13 are only examples, and other related or potential terminals or servers, if applicable to the embodiments of the present disclosure, are also to be included in the protection scope of the embodiments of the present disclosure, and are included herein by reference.

Figure 2:
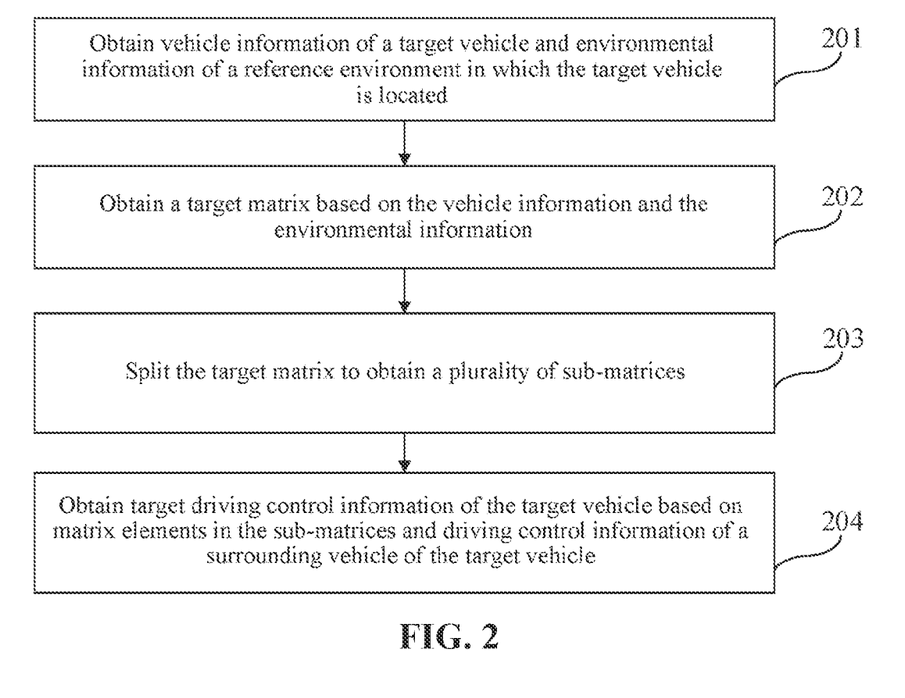
FIG. 2 is a flowchart of a method for controlling a vehicle according to an embodiment of the present disclosure.

Based on the implementation environment shown in FIG. 1, referring to FIG. 2, this embodiment of the present disclosure provides a method for controlling a vehicle. The method may be applied to the terminal shown in FIG. 1. As shown in FIG. 2, the method includes the following steps.

Step 201. Obtain vehicle information of a target vehicle and environmental information of a reference environment in which the target vehicle is located.

The target vehicle is a to-be-controlled vehicle. The vehicle information of the target vehicle includes vehicle state information and vehicle action information. The vehicle state information includes but is not limited to a location (latitude and longitude), an orientation (east, south, west, or north), a speed, an acceleration, a throttle amount, a brake amount, and a steering wheel angle of the target vehicle, and the vehicle action information includes a variation of the vehicle state information.

Exemplarily, the reference environment in which the target vehicle is located is a road, a residential region, or the like, and the environmental information of the reference environment in which the target vehicle is located includes maps, drivable routes, dynamic obstacles, static obstacles, and the like of the reference environment. For example, when the reference environment is a road, the drivable routes are a plurality of lanes of the road, the dynamic obstacles are other vehicles on the road, and the static obstacles are isolation guardrails in the middle of the road.

One or more current states of the target vehicle can be determined according to the vehicle state information and the environmental information. Still using an example in which the reference environment is the road. A lane in which the target vehicle is located can be determined according to a location and an orientation, and a driving speed and a driving direction of the target vehicle can be determined according to a speed, an acceleration, a throttle amount, a brake amount, and a steering wheel angle. Subsequently, the one or more current states of the target vehicle can be obtained with reference to the lane, the driving speed, and the driving direction. For example, the current state of the target vehicle is driving along a first lane at a constant speed, and so on.

A current action of the target vehicle can be determined according to the vehicle action information. For example, changes in a driving speed of the target vehicle are determined according to variations of a speed, an acceleration, a throttle amount, and a brake amount, and changes in a driving direction of the target vehicle are determined according to a variation of a steering wheel angle. Therefore, the current action of the target vehicle can be obtained according to the changes in the driving speed and the changes in the driving direction. The current action is, for example, to accelerate or decelerate to the left.

Exemplarily, the foregoing information can be obtained through detection by a detector located on the target vehicle. Certainly, a manner of obtaining the foregoing information is not limited in the present disclosure. Regardless of which manner is used to obtain the foregoing information, a target matrix can be obtained based on the foregoing information after the foregoing information is obtained. For details, refer to step 202.

Step 202. Obtain a target matrix based on the vehicle information and the environmental information.

It can be known according to the descriptions in step 201 that, the one or more current states that the target vehicle may be in and the current action of the target vehicle can be obtained according to the vehicle information and the environmental information. Assuming that a next state of the target vehicle is only related to the current state and current action, if the current action is performed in the current state, there is a specific probability that the target vehicle transfers from the current state to the next state. For example, if the current state is going straight along a first lane, and the current action is accelerating to the left, the next state may be entering a second lane that is on the left of the first lane, or may be still going straight along the first lane or another state.

Therefore, the target matrix may be obtained according to the one or more current states, and one or more next states transferred from the one or more current states and the current action. An element in the target matrix is a probability value that the target vehicle transfers to the next state after performing an action in the current state. A number of dimensions of the target matrix is equal to a number of current states.

For any element in the target matrix, a value of the element may be obtained through calculation. It should be noted that, when the reference environment in which the target vehicle is located is relatively complex, for example, when there is a large number of lanes on a road and there are many vehicles around the target vehicle, the number of current states that the target vehicle may be in is also relatively large, resulting in a relatively large number of dimensions of the target matrix. Therefore, if calculation is performed based on the target matrix subsequently, the calculation complexity is relatively high, and a calculation amount is relatively large. Based on the foregoing, in this embodiment, before the calculation is performed, the target matrix is split first. For details, refer to step 203.

Step 203. Split the target matrix to obtain a plurality of sub-matrices.

During implementation, the target matrix is split into a plurality of continued multiplicative sub-matrices, a matrix element in each sub-matrix is still a probability value that the target vehicle transfers to a next state after performing an action in a current state. The dimension of each of the sub-matrices are less than a dimension of the target matrix. For example, each sub-matrix is a two-dimensional matrix. Certainly, the dimension of the sub-matrix is not limited in this embodiment. Exemplarily, the sub-matrix is a three-dimensional matrix or a four-dimensional matrix with a dimension higher than that of a two-dimensional matrix.

In an optional implementation, the splitting the target matrix to obtain a plurality of sub-matrices includes: determining the matrix element in the each sub-matrix in a nonparametric estimation manner based on the current state and the next state of the target vehicle in the target matrix, a sampling point obtained by sampling the next state, and a standard normal distribution function.

For example, for any matrix element, determination is performed based on the following formula (1):

$$p(x_{t+1} | x_t, a_t) = \frac{1}{n} \sum_i N\left(\frac{x_{t+1} - x_{t+1}^i}{h}\right) \quad (1)$$

where $x_{t+1}$ is a next state, $x_t$ is a current state, $a_t$ is a current action, $p(x_{t+1}|x_t, a_t)$ represents a probability value (also referred to as a condition probability) of $x_t$ transferring to $x_{t+1}$ when $a_t$ is performed, and $p(x_{t+1}|x_t, a_t)$ is a matrix element, $x_{t+1}^i$ is an $i^{th}$ sampling point obtained by sampling the next state, $i \leq n$. In each time of sampling, the target vehicle is enabled to perform $a_t$ in $x_t$, and an actually obtained state is the sampling point.

In formula (1), $$N\left(\frac{x_{t+1} - x_{t+1}^i}{h}\right)$$

is a standard normal distribution function. The standard normal distribution function is a kernel function used in nonparametric estimation, and h is a kernel width. It should be noted that, the kernel width h is a hyperparameter, which is set according to actual requirements or experience.

$$N\left(\frac{x_{t+1} - x_{t+1}^i}{h}\right)$$

may be expressed as the following formula (2):

$$N\left(\frac{x_{t+1} - x_{t+1}^i}{h}\right) = \frac{1}{\sqrt{2\pi}} \exp\left[-\frac{(x_{t+1} - x_{t+1}^i)^2}{2h^2}\right] \quad (2)$$

The matrix element in the each sub-matrix is determined in the nonparametric estimation manner, which has higher operation efficiency and better stability. Optionally, referring to FIG. 3, after the matrix element in the each sub-matrix is determined in the nonparametric estimation manner, the method provided in this embodiment further includes: performing, for any matrix element, iteration calculation based on the matrix element, to obtain an updated matrix element.

Figure 3:
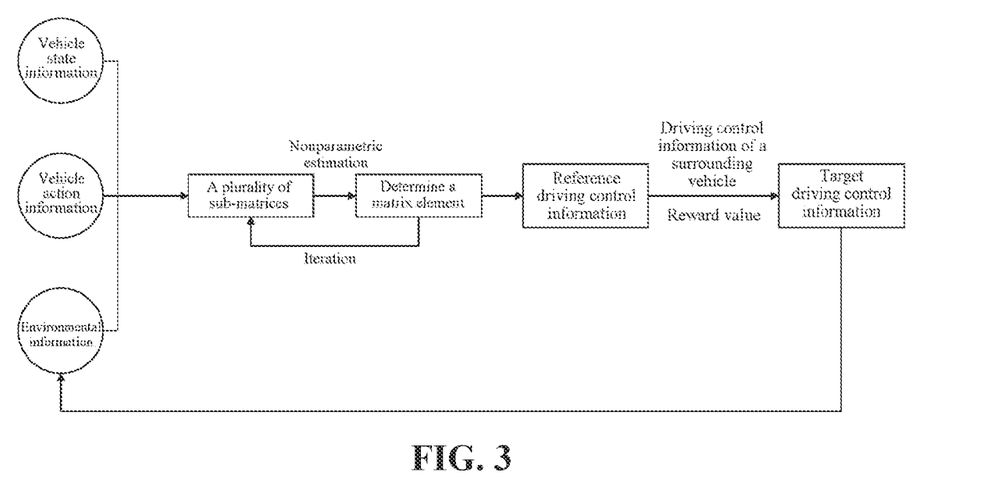
FIG. 3 is an architectural diagram of a method for controlling a vehicle according to an embodiment of the present disclosure.

Each matrix element in the matrix is a probability value that the target vehicle transfers to the next state after performing an action in the current state. In a transfer process, next states corresponding to different moments are different. For example, the current state is a constant speed state, a state at a next moment is an acceleration state, and a state at a moment following the next moment returns to a constant speed state, which causes the matrix element to fluctuate at the different moments. Therefore, the matrix element may be iterated and updated at different moments, so that the matrix element finally converges to a stable value, to obtain target driving control information of the target vehicle based on the stable value in a subsequent process. For details, refer to step 204.

That is, the performing, for any matrix element, iteration calculation based on the matrix element to obtain an updated matrix element includes: determining, for any matrix element, values of the matrix element at different moments; and performing iteration calculation according to the values of the matrix element at the different moments in response to that the values of the matrix element at the different moments are different, to obtain the updated matrix element, where the updated matrix element corresponds to the same value at the different moments.

A case that a matrix element at different moments corresponds to different values is a case described in the foregoing description that the matrix element fluctuates at the different moments. In this case, iteration calculation is performed based on different values of the matrix element at the different moments. After the iteration calculation process converges, a stable updated matrix element can be obtained. Correspondingly, in response to that a matrix element corresponds to the same value at the different moments (that is, the matrix element does not fluctuate at the different moments), or among the respective values for a certain matrix element at different moments, the number of values which are equal is not less than a number threshold (that is, the matrix element at the different moments has a small degree of fluctuation), there is no need to perform the iteration calculation process, and in step 204, the target driving control information of the target vehicle can be directly obtained based on the matrix element. A value of the number threshold is not limited in this embodiment.

Step 204. Obtain the target driving control information of the target vehicle based on matrix elements in the sub-matrices and driving control information of a surrounding vehicle of the target vehicle, and control the target vehicle according to the target driving control information.

The driving control information refers to an action that a vehicle can perform. For example, the driving control information includes, but is not limited to, driving at a constant speed along a current road, accelerating along a current road, decelerating along a current road, changing to a left lane and driving at a constant speed, changing to a left lane and accelerating, or the like. Considering that there may be one or more other vehicles around the target vehicle in the reference environment, it is necessary to combine the driving control information of the surrounding vehicle to determine the target driving control information of the target vehicle to ensure that the target vehicle controlled by the target driving control information can safely interact with the surrounding vehicle.

In an optional implementation, the obtaining target driving control information of the target vehicle based on matrix elements in the sub-matrices and driving control information of a surrounding vehicle of the target vehicle includes the following steps 2041 to 2043.

Step 2041. Determine probability values of one or more next states of the target vehicle based on the matrix elements in the sub-matrices.

During implementation, the probability value of the next state of the target vehicle may be determined according to the following formula (3):

$$p(x_{t+1}) = \iiint_{x_t, z_t, a_t} p(x_{t+1}, x_t, z_t, a_t) da_t dz_t dx_t \qquad (3)$$

where $p(x_{t+1})$ represents the probability value of the next state, $x_t$ represents a current state, $a_t$ represents a current action, and $z_t$ represents a current observation value.

The formula (3) may be decomposed into the following formula (4), which is expressed by a matrix element $p(x_{t+1} | x_t, a_t)$:

$$p(x_{t+1}) = \iiint_{x_t, z_t, a_t} p(x_{t+1} | x_t, a_t) p(a_t | z_t, x_t) p(z_t | x_t) p(x_t) \, da_t dz_t dx_t \qquad (4)$$

In addition, the surrounding vehicle is represented by a superscript v, and a probability of a next state of any surrounding vehicle is expressed as the following decomposition form (5):

$$p^v(x_{t+1}^v, x_t^v, z_t^v, a_t^v) = p(x_{t+1}^v | x_t^v, a_t^v) p(a_t^v | x_t^v, z_t^v) p(z_t^v | x_t^v) p(x_t^v) \qquad (5)$$

According to an independence assumption, a joint next-state probability of all surrounding vehicles is equal to a product of probabilities of next states of the surrounding vehicles. Therefore, the joint next-state probability of all the surrounding vehicles is expressed as the following formula (6):

$$p^v(x_{t+1}) = \Pi_{v \in V} \iiint_{x_t, z_t, a_t} p^v(x_{t+1}^v, x_t^v, z_t^v, a_t^v) da_t^v dz_t^v dx_t^v \qquad (6)$$

Subsequently, driving control information $\pi_t^v$ of the surrounding vehicle is introduced. Assuming that the surrounding vehicle is driving according to road driving rules, $\pi_t^v$ can be determined, and the formula (5) is expressed as the following decomposed formula (7):

$$p^v(x_{t+1}^v, x_t^v, z_t^v, a_t^v, \pi_t^v) = p(x_{t+1}^v | x_t^v, a_t^v) p(a_t^v | x_t^v, z_t^v, \pi_t^v) p(\pi_t^v | x_t^v) p(z_t^v | x_t^v) p(x_t^v) \qquad (7)$$

Still according to the independence assumption, the target vehicle is represented by a superscript q. The target vehicle and all the surrounding vehicles need to be considered comprehensively for determining the probability value of the next state of the target vehicle, and the probability value of the next state of the target vehicle may be expressed as the following formula (8):

$$p(x_{t+1}) \approx \int_{x^q} \int_{z^q} p^q(x_{t+1}^q, x_t^q, z_t^q, a_t^q, \pi_t^q) dz_t^q dx_t^q \qquad (8)$$

$$\Pi_{v \in V, v \neq q} \left[ \sum_\pi \int \int_{x^v z^v} p^v(x_{t+1}^v, x_t^v, z_t^v, a_t^v, \pi_t^v) dz_t^v dx_t^v \right]$$

where $\pi_t^q$ is driving control information adopted by the target vehicle at the current moment, which can be determined through the vehicle state and the vehicle action in step 201.

After the probability value of each next state is determined according to the foregoing formulas, reference driving control information is further obtained based on the probability value. Refer to step 2042.

Step 2042. Obtain one or more pieces of reference driving control information according to a correspondence (a corresponding relationship) between the probability values of the next states and the driving control information.

During implementation, a data set storing the correspondence between the probability values of the next states and the driving control information may be obtained. In the data set, driving control information is manually set for a plurality of sample vehicles, and probability values of next states obtained by executing the driving control information by the sample vehicles and the driving control information are correspondingly stored to obtain a correspondence between the probability values of the next states and the driving control information.

For the probability values of the next states determined in step 2041, one or more pieces of driving control information may be determined according to the correspondence in the data set, and the driving control information having the largest number in the one or more pieces of driving control information is used as the reference driving control information of the probability value of the next state. It can be learned that the one or more pieces of reference driving control information can be obtained according to probability values of the one or more next states of the target vehicle.

Subsequently, in this embodiment, the target driving control information for controlling the target vehicle is then selected from the one or more pieces of reference driving control information. Refer to step 2043.

Step 2043. Obtain the target driving control information from the one or more pieces of reference driving control information based on the driving control information of the surrounding vehicle of the target vehicle.

For each surrounding vehicle, it can be assumed that the surrounding vehicle drives according to reference road driving rules, so that driving control information of the surrounding vehicle is obtained based on the reference road driving rules. After the driving control information of the surrounding vehicle is obtained, the target driving control information can be determined with reference to the driving control information of the surrounding vehicle of the target vehicle. Optionally, the obtaining the target driving control information from the one or more pieces of reference driving control information based on the driving control information of the surrounding vehicle of the target vehicle includes: determining reward values corresponding to each piece of reference driving control information at one or more moments in the future based on the driving control information of the surrounding vehicle of the target vehicle; and determining the reference driving control information corresponding to the largest sum of the reward values at the moments as the target driving control information.

It should be noted that, each piece of reference driving control information includes a plurality of state-to-action mappings, so that when the target vehicle is in different states, an action that needs to be performed in each state can be determined according to the plurality of state-to-action mappings. For example, a constant speed state and an acceleration action are mapped, so that when the target vehicle is in a constant speed state, an indicated action that the target vehicle needs to perform is to accelerate and overtake. In addition, the reward value is used for indicating a priority of an action performed by the target vehicle, and the priority of the action performed by the target vehicle needs to be determined with reference to the driving control information of the surrounding vehicle. Therefore, a reward value corresponding to an action performed at each moment may be determined based on the driving control information of the surrounding vehicle.

During implementation, for the action performed by the target vehicle at each moment, it can be determined, based on the driving control information of the surrounding vehicle, whether the target vehicle performing the action collides with the surrounding vehicle. If it is determined that a collision occurs, it indicates that an effect of the action is poor, and a reward value corresponding to the action at the moment is a negative value (penalty value). Correspondingly, if it is determined that no collision occurs, the reward value corresponding to the action at the moment is a positive value (reward value).

In addition, the reward value of the action may also be determined according to a driving mode set for the target vehicle. For example, in an efficient mode, a reward value of an acceleration and overtaking action is higher than a reward value of a deceleration and following action. In a normal mode, the reward value of the deceleration and following action is equal to the reward value of the acceleration and overtaking action. In a security mode, the reward value of the acceleration and overtaking action is less than the reward value of the deceleration and following action.

For any reference driving control information, after the target vehicle determines, according to the mapping between the state and the action included in the reference driving control information, the reward value corresponding to the action performed at the each moment, summation calculation is performed on the reward value corresponding to the each moment, and reference driving control information with the largest sum of reward values corresponding to the moments is used as the target driving control information. This process may be expressed as the following formula (9):

$$\pi^* = \mathrm{argmax}\ \Sigma_{t=0}^{H} \gamma^t \int R(x_t) \cdot p(x_t) dx_t \qquad (9)$$

where $\pi^*$ represents the target driving control information, t represents time, $t \leq H$, H may be set according to experience, $\gamma$ represents a discount factor, a value of the discount factor is a non-negative number not greater than 1, which is used for indicating importance of a reward value at a moment in the future relative to a reward value at a current moment, and R is a reward value.

After the target driving control information is obtained, the target driving control information may be used for controlling the target vehicle. During implementation, an action that the target vehicle needs to perform is determined from a plurality of mappings included in the target driving control information according to a state of the target vehicle at each moment, to control the target vehicle according to the target driving control information.

To sum up, in this embodiment, a plurality of sub-matrices are obtained by splitting a target matrix obtained based on vehicle information and environmental information, and target driving control information for controlling a target vehicle is obtained based on the sub-matrices, not only avoiding curse of dimensionality, but also reducing calculation complexity, and reducing a calculation amount required for obtaining the target driving control information, so that the method for controlling the vehicle is suitable for a relatively complex reference environment. In the target driving control information obtained in this embodiment, driving control information of a surrounding vehicle that may interact with the target vehicle is further considered. Therefore, safety of the target vehicle in a multi-vehicle interaction scenario is ensured, so that the method for controlling the vehicle is suitable for the multi-vehicle interaction scenario.

Further, in this embodiment, a matrix element in each sub-matrix is further determined in the foregoing nonparametric estimation manner, which has higher operation efficiency and better stability.

Figure 4:
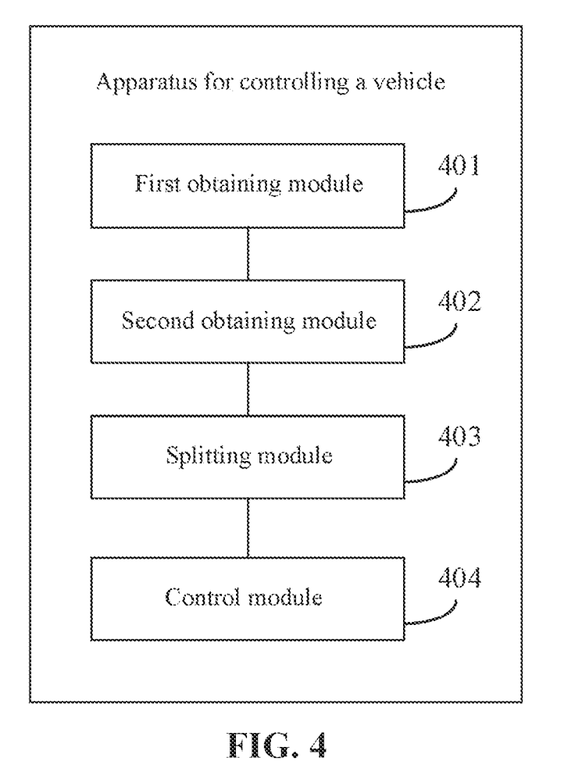
FIG. 4 is a schematic structural diagram of an apparatus for controlling a vehicle according to an embodiment of the present disclosure.

An embodiment of the present disclosure provides an apparatus for controlling a vehicle. Referring to FIG. 4, the apparatus includes:
- a first obtaining module 401, configured to obtain vehicle information of a target vehicle and environmental information of a reference environment in which the target vehicle is located;
- a second obtaining module 402, configured to obtain a target matrix based on the vehicle information and the environmental information, where an element in the target matrix is a probability value that the target vehicle transfers to a next state after performing an action in a current state;
- a splitting module 403, configured to split the target matrix to obtain a plurality of sub-matrices; and
- a control module 404, configured to obtain target driving control information of the target vehicle based on matrix elements in the sub-matrices and driving control information of a surrounding vehicle of the target vehicle, where the target driving control information is used for controlling the target vehicle.

Optionally, the splitting module 403 is configured to determine a matrix element in each of the sub-matrices in a nonparametric estimation manner based on the current state and the next state of the target vehicle in the target matrix, a sampling point obtained by sampling the next state, and a standard normal distribution function.

Optionally, the apparatus further includes a calculation module, configured to perform, for any matrix element, iteration calculation based on the matrix element, to obtain an updated matrix element.

Optionally, the calculation module is configured to determine, for any matrix element, values of the matrix element at different moments; and perform iteration calculation according to the values of the matrix element at the different moments in response to that the values of the matrix element at the different moments are different, to obtain the updated matrix element, where the updated matrix element corresponds to the same value at the different moments.

Optionally, the control module 404 is configured to determine probability values of one or more next states of the target vehicle based on the matrix elements in the sub-matrices; obtain one or more pieces of reference driving control information according to a correspondence between the probability values of the next states and the driving control information; and obtain the target driving control information from the one or more pieces of reference driving control information based on the driving control information of the surrounding vehicle of the target vehicle.

Optionally, the control module 404 is configured to determine reward values corresponding to each piece of reference driving control information at one or more moments in the future based on the driving control information of the surrounding vehicle of the target vehicle; and determine the reference driving control information corresponding to the largest sum of the reward values at the moments as the target driving control information.

To sum up, in this embodiment, a plurality of sub-matrices are obtained by splitting a target matrix obtained based on vehicle information and environmental information, and target driving control information for controlling a target vehicle is obtained based on the sub-matrices, not only avoiding curse of dimensionality, but also reducing calculation complexity, and reducing a calculation amount required for obtaining the target driving control information, so that the method for controlling the vehicle is suitable for a relatively complex reference environment. In the target driving control information obtained in this embodiment, driving control information of a surrounding vehicle that may interact with the target vehicle is further considered. Therefore, safety of the target vehicle in a multi-vehicle interaction scenario is ensured, so that the method for controlling the vehicle is suitable for the multi-vehicle interaction scenario.

Further, in this embodiment, a matrix element in each sub-matrix is further determined in the foregoing nonparametric estimation manner, which has higher operation efficiency and better stability.

It should be noted that, when the apparatus provided in the foregoing embodiments implements functions of the apparatus, the division of the foregoing functional modules is merely an example for description. In the practical application, the functions are assigned to and completed by different functional modules according to the requirements, that is, the internal structure of the device is divided into different functional modules, to implement all or some of the functions described above. In addition, the apparatus provided in the foregoing embodiments and the method embodiments fall within the same conception. For details of a specific implementation process, refer to the method embodiments. Details are not described herein again.

Figure 5:
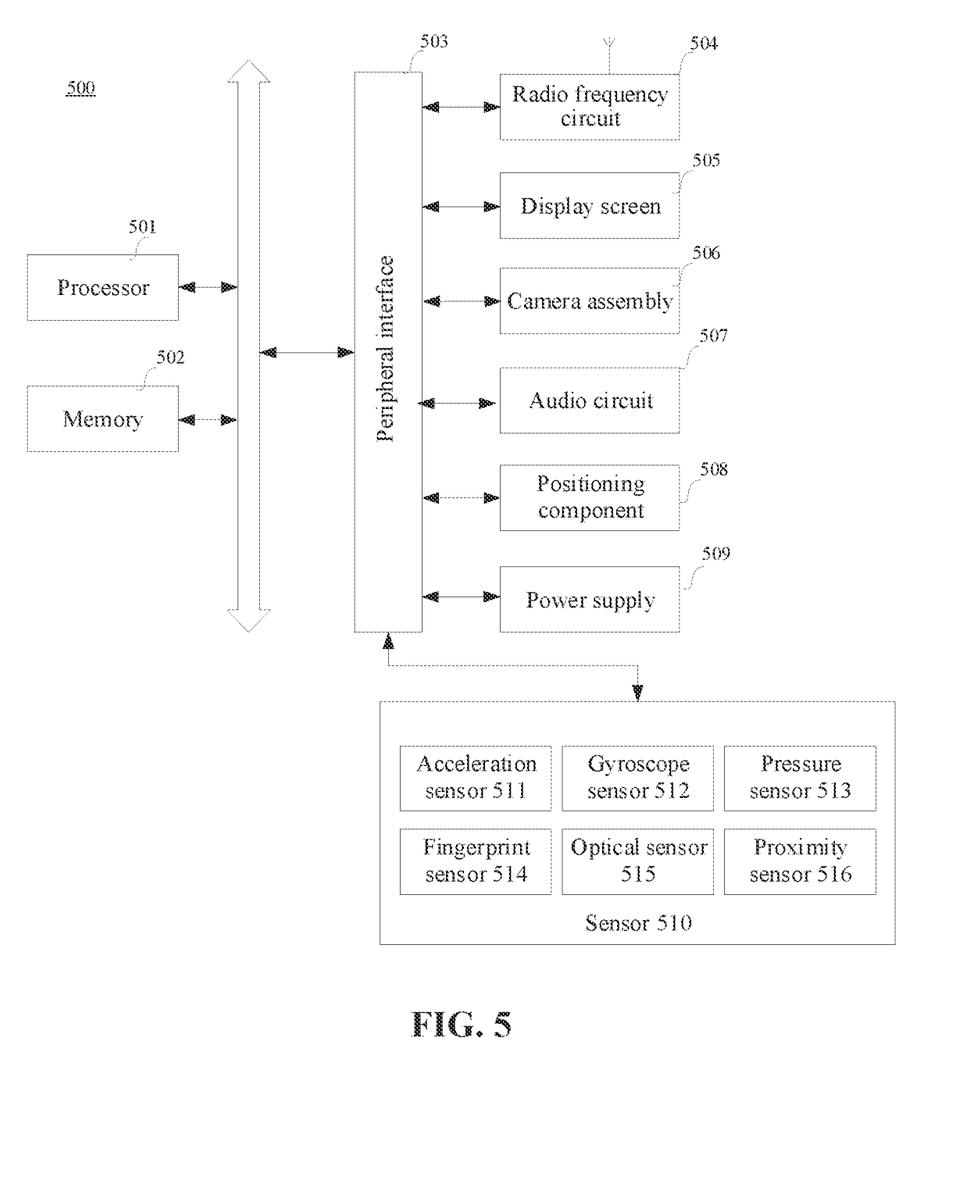
FIG. 5 is a schematic structural diagram of a terminal according to an embodiment of the present disclosure.

FIG. 5 is a schematic structural diagram of a terminal 500 according to an embodiment of the present disclosure. Exemplarily, the terminal 500 is a portable mobile terminal, for example, a smartphone, a tablet computer, a Moving Picture Experts Group Audio Layer III (MP3) player, a Moving Picture Experts Group Audio Layer IV (MP4) player, a notebook computer, or a desktop computer. The terminal 500 may also be referred to as user equipment, a portable terminal, a laptop terminal, a desktop terminal, or by another name.

Generally, the terminal 500 includes a processor 501 and a memory 502.

Exemplarily, the processor 501 includes one or more processing cores, and may be, for example, a 4-core processor or a 5-core processor. The processor 501 may be implemented in at least one hardware form of a digital signal processor (DSP), a field-programmable gate array (FPGA), and a programmable logic array (PLA). Exemplarily, the processor 501 includes a main processor and a coprocessor. The main processor is a processor configured to process data in an awake state, and is also referred to as a central processing unit (CPU). The coprocessor is a low power consumption processor configured to process data in a standby state. In some embodiments, the processor 501 is integrated with a graphics processing unit (GPU). The GPU is configured to render and draw content that needs to be displayed on a display screen. In some embodiments, the processor 501 further includes an AI processor. The AI processor is configured to process computing operations related to machine learning.

Exemplarily, the memory 502 includes one or more computer-readable storage media. The computer-readable storage medium is non-transient, or non-transitory. The memory 502 further includes a high-speed random access memory and a non-volatile memory, such as one or more magnetic disk storage devices or flash storage devices. In some embodiments, a non-transitory computer-readable storage medium in the memory 502 is configured to store at least one instruction, the at least one instruction being configured to be executed by the processor 501 to implement the method for controlling the vehicle provided in the method embodiments of the present disclosure.

In some embodiments, the terminal 500 may optionally include a peripheral interface 503 and at least one peripheral. The processor 501, the memory 502, and the peripheral interface 503 may be connected through a bus or a signal cable. Each peripheral is connected to the peripheral interface 503 through a bus, a signal cable, or a circuit board. Exemplarily, the peripheral includes: at least one of a radio frequency (RF) circuit 504, a touch display screen 505, a camera assembly 506, an audio circuit 507, a positioning component 508, and a power supply 509.

The peripheral interface 503 may be configured to connect at least one peripheral related to input/output (I/O) to the processor 501 and the memory 502. In some embodiments, the processor 501, the memory 502, and the peripheral interface 503 are integrated on the same chip or circuit board. In some other embodiments, any one or two of the processor 501, the memory 502, and the peripheral interface 503 can be implemented on a separate chip or circuit board, which is not limited in this embodiment.

The RF circuit 504 is configured to receive and transmit an RF signal, which is also referred to as an electromagnetic signal. The RF circuit 504 communicates with a communication network and other communication devices by using the electromagnetic signal. The RF circuit 504 converts an electric signal into an electromagnetic signal for transmission, or converts a received electromagnetic signal into an electric signal. Optionally, the RF circuit 504 includes: an antenna system, an RF transceiver, one or more amplifiers, a tuner, an oscillator, a digital signal processor, a codec chip set, a subscriber identity module card, and the like. The RF circuit 504 may communicate with other terminals through at least one wireless communication protocol. The wireless communication protocol includes, but is not limited to, a metropolitan area network, generations of mobile communication networks (2G, 3G, 4G, and 5G), a wireless local area network, and/or a wireless fidelity (Wi-Fi) network. In some embodiments, the RF circuit 504 may further include a circuit related to near field communication (NFC), which is not limited in the embodiments of the present disclosure.

The display screen 505 is configured to display a user interface (UI). The UI may include a graph, a text, an icon, a video, and any combination thereof. In a case that the display screen 505 is a touch display screen, the display screen 505 further has a capability of acquiring a touch signal on or above a surface of the display screen 505. The touch signal is inputted to the processor 501 for processing as a control signal. In this case, the display screen 505 is further configured to provide a virtual button and/or a virtual keyboard, which is also referred to as a soft button and/or a soft keyboard. In some embodiments, there is one display screen 505 disposed on a front panel of the terminal 500. In some other embodiments, there are at least two display screens 505 respectively disposed on different surfaces of the terminal 500 or designed in a foldable shape. In still some other embodiments, the display screen 505 is a flexible display screen disposed on a curved surface or a folded surface of the terminal 500. Even, the display screen 505 can be further set in a non-rectangular irregular pattern, namely, a special-shaped screen. Exemplarily, the display screen 505 is manufactured by using a material such as a liquid crystal display (LCD) or an organic light-emitting diode (OLED).

The camera assembly 506 is configured to acquire images or videos. Optionally, the camera assembly 506 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any one of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera assembly 506 further includes a flash. The flash is a single color temperature flash or a double color temperature flash. The double color temperature flash is a combination of a warm light flash and a cold light flash, and is used for light compensation under different color temperatures.

The audio circuit 507 includes a microphone and a speaker. The speaker is configured to collect sound waves of a user and an environment, and convert the sound waves into electric signals and input the electrical signals into the processor 501 for processing, or input the electrical signals into the RF circuit 504 to implement speech communication. For the purpose of stereo acquisition or noise reduction, there are a plurality of microphones, disposed at different parts of the terminal 500 respectively. Alternatively, the microphone is an array microphone or an omni-directional acquisition microphone. The speaker is configured to convert electric signals from the processor 501 or the RF circuit 504 into sound waves. The speaker is a conventional thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging or other uses. In some embodiments, the audio circuit 507 further includes an earphone jack.

The positioning component 508 is configured to determine a current geographic location of the terminal 500, to implement navigation or a location-based service (LBS). The positioning component 508 may be a positioning component based on the Global Positioning System (GPS) of the United States, the BeiDou System of China, the GLONASS System of Russia, or the GALILEO System of the European Union.

The power supply 509 is configured to supply power to components in the terminal 500. The power supply 509 is an alternating current, a direct current, a disposable battery, or a rechargeable battery. When the power supply 509 includes a rechargeable battery, the rechargeable battery can support wired charging or wireless charging. The rechargeable battery may further be configured to support a quick charge technology.

In some embodiments, the terminal 500 further includes one or more sensors 510. The one or more sensors 510 include, but are not limited to, an acceleration sensor 511, a gyroscope sensor 512, a pressure sensor 513, a fingerprint sensor 514, an optical sensor 515, and a proximity sensor 516.

The acceleration sensor 511 can detect accelerations on three coordinate axes of a coordinate system established by the terminal 500. For example, the acceleration sensor 511 can be configured to detect components of the gravity acceleration on the three coordinate axes. The processor 501 can control, according to a gravity acceleration signal acquired by the acceleration sensor 511, the touch display screen 505 to display the UI in a frame view or a portrait view. The acceleration sensor 511 can be further configured to acquire motion data of a game or a user.

The gyroscope sensor 512 can detect a body direction and a rotation angle of the terminal 500. The gyroscope sensor 512 can acquire a 3D action of the user on the terminal 500 together with the acceleration sensor 511. The processor 501 can implement the following functions according to the data acquired by the gyroscope sensor 512: motion sensing (for example, changing the UI according to a tilt operation of the user), image stabilization during shooting, game control, and inertial navigation.

Exemplarily, the pressure sensor 513 is disposed on a side frame of the terminal 500 and/or a lower layer of the touch display screen 505. When the pressure sensor 513 is disposed on the side frame of the terminal 500, a holding signal of the user to the terminal 500 can be detected, and left/right hand identification or a quick action may be performed by the processor 501 according to the holding signal acquired by the pressure sensor 513. When the pressure sensor 513 is disposed at the lower layer of the touch display screen 505, the processor 501 implements control of operable controls on the UI interface according to a pressure operation on the touch display screen 505 by the user. The operable control includes at least one of a button control, a scroll bar control, an icon control, and a menu control.

The fingerprint sensor 514 is configured to acquire a user's fingerprint, and the processor 501 identifies a user's identity according to the fingerprint acquired by the fingerprint sensor 514, or the fingerprint sensor 514 identifies a user's identity according to the acquired fingerprint. When identifying that the user's identity is a trusted identity, the processor 501 authorizes the user to perform related sensitive operations. The sensitive operations include: unlocking a screen, viewing encryption information, downloading software, paying and changing a setting, and the like. Exemplarily, the fingerprint sensor 514 is disposed on a front face, a back face, or a side face of the terminal 500. When a physical button or a vendor logo is disposed on the terminal 500, the fingerprint sensor 514 may be integrated together with the physical button or the vendor logo.

The optical sensor 515 is configured to acquire ambient light intensity. In an embodiment, the processor 501 can control display brightness of the touch display screen 505 according to the ambient light intensity acquired by the optical sensor 515. Exemplarily, when the ambient light intensity is relatively high, the display brightness of the touch display screen 505 is increased; and when the ambient light intensity is relatively low, the display brightness of the touch display screen 505 is reduced. In another embodiment, the processor 501 can further dynamically adjust a camera parameter of the camera assembly 506 according to the ambient light intensity acquired by the optical sensor 515.

The proximity sensor 516 is also referred to as a distance sensor and is generally disposed at the front panel of the terminal 500. The proximity sensor 516 is configured to collect the distance between the user and the front surface of the terminal 500. In an embodiment, when the proximity sensor 516 detects that a distance between the user and the front surface of the terminal 500 is gradually reduced, the processor 501 controls the touch display screen 505 to be switched from a bright screen state to a rest screen state; and in a case that the proximity sensor 516 detects the distance between the user and the front surface of the terminal 500 is gradually increased, the processor 501 controls the touch display screen 505 to be switched from the rest screen state to the bright screen state.

A person skilled in the art can understand that the structure shown in FIG. 5 does not constitute a limitation to the terminal 500, and the terminal can include more or fewer components than those shown in the figure, or some components may be combined, or a different component arrangement may be used.

An embodiment of the present disclosure provides an electronic device. The device includes a memory and a processor, the memory storing at least one instruction, the at least one instruction being loaded and executed by the processor to implement the method for controlling the vehicle according to any one of possible implementations of the present disclosure.

An embodiment of the present disclosure provides a non-transitory computer-readable storage medium storing at least one instruction, the instruction being loaded and executed by a processor to implement the method for controlling the vehicle according to any one of possible implementations of the present disclosure.

An embodiment of the present disclosure provides a computer program or a computer program product including computer instructions, the computer instructions, when executed by a computer, causing the computer to implement the method for controlling the vehicle according to any one of the exemplary embodiments of the present disclosure.

All of the above optional technical solutions can be combined randomly to form optional embodiments of the present disclosure. Details are not described herein again.

A person of ordinary skill in the art can understand that all or some of the steps of the embodiments can be implemented by hardware or a program instructing related hardware. The program can be stored in a non-transitory computer-readable storage medium. The non-transitory computer-readable storage medium includes a read-only memory, a magnetic disk, or an optical disc.

The foregoing descriptions are merely embodiments of the present disclosure and not intended to limit the embodiments of the present disclosure. Any modification, equivalent replacement, or improvement made within the principle of the embodiments of the present disclosure shall fall within the protection scope of the embodiments of the present disclosure.

What is claimed is:

1. A method for controlling a vehicle, comprising:
obtaining vehicle information of a target vehicle and environmental information of a reference environment in which the target vehicle is located;
obtaining a target matrix based on the vehicle information and the environmental information, wherein an element in the target matrix is a probability value that the target vehicle transfers to a next state after performing an action in a current state, and a number of dimensions of the target matrix is equal to a number of current states;
splitting the target matrix to obtain a plurality of sub-matrices;
obtaining target driving control information of the target vehicle based on matrix elements in the sub-matrices and driving control information of a surrounding vehicle of the target vehicle; and
controlling the target vehicle by using the target driving control information.

2. The method according to claim 1, wherein the splitting the target matrix to obtain a plurality of sub-matrices comprises:
determining a matrix element in each of the sub-matrices in a nonparametric estimation manner based on the current state and the next state of the target vehicle, a sampling point obtained by sampling the next state, and a standard normal distribution function.

3. The method according to claim 2, wherein after the determining a matrix element in each of the sub-matrices in a nonparametric estimation manner, the method further comprises:
performing, for any matrix element, iteration calculation based on the matrix element, to obtain an updated matrix element.

4. The method according to claim 3, wherein the performing, for any matrix element, iteration calculation based on the matrix element, to obtain an updated matrix element comprises:
determining, for any matrix element, values of the matrix element at different moments; and
performing iteration calculation according to the values of the matrix element at the different moments in response to the values of the matrix element at the different moments being different, to obtain the updated matrix element, wherein the updated matrix element corresponds to the same value at the different moments.

5. The method according to claim 1, wherein the obtaining target driving control information of the target vehicle based on matrix elements in the sub-matrices and driving control information of a surrounding vehicle of the target vehicle comprises:
determining probability values of one or more next states of the target vehicle based on the matrix elements in the sub-matrices;
obtaining one or more pieces of reference driving control information according to a correspondence between the probability values of the next states and the driving control information; and
obtaining the target driving control information from the one or more pieces of reference driving control information based on the driving control information of the surrounding vehicle of the target vehicle.

6. The method according to claim 5, wherein the obtaining the target driving control information from the one or more pieces of reference driving control information based on the driving control information of the surrounding vehicle of the target vehicle comprises:
determining reward values corresponding to each piece of reference driving control information at one or more moments in the future based on the driving control information of the surrounding vehicle of the target vehicle; and determining the reference driving control information corresponding to the largest sum of the reward values at the moments as the target driving control information.

7. An apparatus for controlling a vehicle, comprising: a processor and a memory, the memory storing at least one instruction, the at least one instruction being loaded and executed by the processor to implement a method for controlling the vehicle, the method comprising:
   obtaining vehicle information of a target vehicle and environmental information of a reference environment in which the target vehicle is located;
   obtaining a target matrix based on the vehicle information and the environmental information, wherein an element in the target matrix is a probability value that the target vehicle transfers to a next state after performing an action in a current state, and a number of dimensions of the target matrix is equal to a number of current states;
   splitting the target matrix to obtain a plurality of sub-matrices;
   obtaining target driving control information of the target vehicle based on matrix elements in the sub-matrices and driving control information of a surrounding vehicle of the target vehicle, wherein; and
   controlling the target vehicle by using the target driving control information.

8. The apparatus according to claim 7, wherein the splitting the target matrix to obtain a plurality of sub-matrices comprises:
   determining a matrix element in each of the sub-matrices in a nonparametric estimation manner based on the current state and the next state of the target vehicle in the target matrix, a sampling point obtained by sampling the next state, and a standard normal distribution function.

9. The apparatus according to claim 8, wherein the method further comprises: performing, for any matrix element, iteration calculation based on the matrix element, to obtain an updated matrix element.

10. The apparatus according to claim 9, wherein the method comprises:
    determining, for any matrix element, values of the matrix element at different moments; and performing iteration calculation according to the values of the matrix element at the different moments in response to the values of the matrix element at the different moments being different, to obtain the updated matrix element, wherein the updated matrix element corresponds to the same value at the different moments.

11. The apparatus according to claim 7, wherein the method comprises:
    determining probability values of one or more next states of the target vehicle based on the matrix elements in the sub-matrices; obtaining one or more pieces of reference driving control information according to a correspondence between the probability values of the next states and the driving control information; and obtaining the target driving control information from the one or more pieces of reference driving control information based on the driving control information of the surrounding vehicle of the target vehicle.

12. The apparatus according to claim 11, wherein the method comprises:
    determining reward values corresponding to each piece of reference driving control information at one or more moments in the future based on the driving control information of the surrounding vehicle of the target vehicle; and determining the reference driving control information corresponding to the largest sum of the reward values at the moments as the target driving control information.

13. A non-transitory computer-readable storage medium, storing at least one instruction, the at least one instruction being loaded and executed by a processor to implement a method for controlling a vehicle, the method comprising:
    obtaining vehicle information of a target vehicle and environmental information of a reference environment in which the target vehicle is located;
    obtaining a target matrix based on the vehicle information and the environmental information, where an element in the target matrix is a probability value that the target vehicle transfers to a next state after performing an action in a current state, and a number of dimensions of the target matrix is equal to a number of current states;
    splitting the target matrix to obtain a plurality of sub-matrices;
    obtaining target driving control information of the target vehicle based on matrix elements in the sub-matrices and driving control information of a surrounding vehicle of the target vehicle; and
    controlling the target vehicle by using the target driving control information.

14. The non-transitory computer-readable storage medium according to claim 13, wherein the method splitting the target matrix to obtain a plurality of sub-matrices comprises:
    determining a matrix element in each of the sub-matrices in a nonparametric estimation manner based on the current state and the next state of the target vehicle in the target matrix, a sampling point obtained by sampling the next state, and a standard normal distribution function.

15. The non-transitory computer-readable storage medium according to claim 14, wherein the method further comprises:
    performing, for any matrix element, iteration calculation based on the matrix element, to obtain an updated matrix element.

16. The non-transitory computer-readable storage medium according to claim 15, wherein the method comprises:
    determining, for any matrix element, values of the matrix element at different moments; and
    performing iteration calculation according to the values of the matrix element at the different moments in response to the values of the matrix element at the different moments being different, to obtain the updated matrix element, wherein the updated matrix element corresponds to the same value at the different moments.

17. The non-transitory computer-readable storage medium according to claim 13, wherein the method comprises:
    determining probability values of one or more next states of the target vehicle based on the matrix elements in the sub-matrices;
    obtaining one or more pieces of reference driving control information according to a correspondence between the probability values of the next states and the driving control information; and
    obtaining the target driving control information from the one or more pieces of reference driving control information based on the driving control information of the surrounding vehicle of the target vehicle.

18. The non-transitory computer-readable storage medium according to claim 17, wherein the method comprises:
- determining reward values corresponding to each piece of reference driving control information at one or more moments in the future based on the driving control information of the surrounding vehicle of the target vehicle; and
- determining the reference driving control information corresponding to the largest sum of the reward values at the moments as the target driving control information.

* * * * *

UNITED STATES PATENT AND TRADEMARK OFFICE
CERTIFICATE OF CORRECTION

PATENT NO. : 12,221,117 B2  
APPLICATION NO. : 17/677671  
DATED : February 11, 2025  
INVENTOR(S) : Shuguang Ding et al.

Page 1 of 1

It is certified that error appears in the above-identified patent and that said Letters Patent is hereby corrected as shown below:

In the Claims

Claim 7, Column 17, Line 24, the text "the target vehicle wherein; and" should read --the target vehicle; and--.

Signed and Sealed this
Thirteenth Day of May, 2025

Coke Morgan Stewart
*Acting Director of the United States Patent and Trademark Office*